United States Patent
Cai et al.

(10) Patent No.: US 6,845,994 B2
(45) Date of Patent: Jan. 25, 2005

(54) GRIPPED BUSHING SYSTEM WITH ALTERNATING RADIAL STIFFNESS

(75) Inventors: Haimian Cai, Ann Arbor, MI (US); Xi Lin, Northville, MI (US); Lakshmana Gummadi, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 107 days.

(21) Appl. No.: 10/272,083

(22) Filed: Oct. 16, 2002

(65) Prior Publication Data

US 2004/0075235 A1 Apr. 22, 2004

(51) Int. Cl.[7] ............................................. B60G 21/055
(52) U.S. Cl. ........................ 280/124.107; 267/140.12; 267/141.12; 267/140.5
(58) Field of Search ................... 267/140.12, 141.2, 267/140.5, 269, 270, 188, 189; 280/124, 107; B60G 21/055

(56) References Cited

U.S. PATENT DOCUMENTS

| | | | |
|---|---|---|---|
| 2,446,621 A | | 8/1948 | Thiry |
| 2,754,111 A | * | 7/1956 | Norrie ........................ 267/189 |
| 4,132,430 A | | 1/1979 | Bantle |
| 4,732,407 A | | 3/1988 | Oyama et al. |
| 4,740,012 A | | 4/1988 | Kondo et al. |
| 4,834,416 A | | 5/1989 | Shimoe et al. |
| 4,854,766 A | * | 8/1989 | Hein ........................... 403/224 |
| 4,883,260 A | | 11/1989 | Kanda |
| 5,080,334 A | | 1/1992 | Mihara et al. |
| 5,112,031 A | * | 5/1992 | Hynds et al. ................ 267/276 |
| 5,190,269 A | | 3/1993 | Ikeda et al. |
| 5,224,790 A | | 7/1993 | Hein |
| 5,413,374 A | | 5/1995 | Pierce |
| 5,540,420 A | | 7/1996 | Luzsicza |
| 5,692,767 A | | 12/1997 | Kato |
| 5,887,859 A | | 3/1999 | Hadano et al. |
| 6,094,818 A | | 8/2000 | Ogawa et al. |
| 6,145,858 A | | 11/2000 | Foulquier |
| 6,286,821 B1 | | 9/2001 | Schaffer |
| 6,419,214 B2 | * | 7/2002 | Palinkas ....................... 267/141 |
| 6,430,774 B1 | * | 8/2002 | McLaughlin et al. .......... 16/2.1 |
| 2002/0121733 A1 | * | 9/2002 | Lewis et al. ................. 267/189 |
| 2003/0197343 A1 | * | 10/2003 | Cai et al. .............. 280/124.107 |

FOREIGN PATENT DOCUMENTS

| | | | |
|---|---|---|---|
| EP | 0 547 945 A1 | * | 6/1993 |
| EP | 1 065 078 A1 | * | 1/2001 |
| JP | 9-177853 A | * | 7/1997 |
| JP | 11-192828 A | * | 7/1999 |
| JP | 2001-271860 | * | 10/2001 |

* cited by examiner

Primary Examiner—Ruth Ian
(74) Attorney, Agent, or Firm—Brinks Hofer Gilson & Lione

(57) ABSTRACT

A stabilizer bar assembly for an automotive vehicle includes a stabilizer bar, a bushing mounted to the stabilizer bar that has a first stiffness in a first radial plane, and a second stiffness in a second radial plane approximately perpendicular to the first radial plane, a bushing retainer in mechanically compressive engagement with the bushing such that the bushing is in frictional engagement with the stabilizer bar, thereby preventing relative movement of the bushing and the stabilizer bar, and a mounting bracket adapted to connect the stabilizer bar to the automotive vehicle.

11 Claims, 5 Drawing Sheets

US 6,845,994 B2

GRIPPED BUSHING SYSTEM WITH ALTERNATING RADIAL STIFFNESS

BACKGROUND OF INVENTION

1. Technical Field of the Invention

The present invention generally relates to a stabilizer bar for an automotive vehicle. More specifically, the present invention relates to the mounting of bushing onto a stabilizer bar that produces a frictional engagement between the bushing and the stabilizer bar and provides different radial stiffness across different planes through the stabilizer bar.

2. Description of the Prior Art

In an automotive vehicle, a stabilizer bar helps to keep the vehicle level, particularly when the vehicle is traveling through a curve. The ends of the stabilizer bar are connected to the right and left wheel assemblies of the vehicle. A pair of brackets, positioned between the ends of the stabilizer bar, secure the stabilizer bar to a structural component of the vehicle. Rubber bushings positioned between the stabilizer bar and the brackets provide limited torsional, axial and radial movement of the stabilizer bar relative to the bracket. The rubber bushings also dampen the movement of the stabilizer bar. Accordingly, the stiffness, or spring rate, of the bushings affects the feel of the suspension of the vehicle.

To keep the bushings positioned on the stabilizer bar, a stop is usually formed within, or mounted onto, the stabilizer bar. Sometimes the stops are provided as an annular rib, or ribs, extending around the stabilizer bar. This makes the stabilizer bar more difficult to manufacture and adds weight to the stabilizer bar. Alternatively, the bushings can be secured in position on the stabilizer bar by using a chemical bonding agent. This, again, adds cost and complexity to the manufacturing process.

Because the stiffness of the bushing affects the vehicle dynamics, bushings having different stiffness are used in different vehicles. This requires the warehousing of different bushings to provide the varying stiffness needed for different vehicles. Further, after time, the bushings loose some resiliency, thereby causing the feel of the suspension in the vehicle to change. In order to repair this condition, the bushing would typically have to be replaced, at significant cost.

As seen from the above, there is a need for an improved stabilizer bar assembly which allows the use of a common bushing to achieve varying stiffness and which can be repaired quickly and economically.

A principle object of this invention is to provide a stabilizer bar assembly that utilizes common components, yet is able to provide varying stiffness for different vehicle applications.

Another object is to provide a stabilizer bar assembly that can be adjusted to compensate for a loss of resiliency in the bushings.

It is also an object of this invention to provide a stabilizer bar assembly having bushings which frictionally engage the stabilizer bar to keep the bushings in position on the stabilizer bar, wherein the bushings are compressed onto the stabilizer bar by a bushing retainer such that the stiffness of the bushing can be adjusted by varying the force at which the bushing retainer compresses the bushings.

It is still further an object of this invention to provide a stabilizer bar assembly having bushings which provide different stiffness along different planes through the stabilizer bar.

SUMMARY OF THE INVENTION

The disadvantages of the prior art are overcome by providing a stabilizer bar assembly, in accordance with the present invention, in which the stabilizer bar assembly includes a stabilizer bar having a bushing mounted thereon, wherein the bushing has a first stiffness in a first radial plane, and a second stiffness in a second radial plane approximately perpendicular to said first radial plane. The assembly further includes a bushing retainer that is in mechanical compressive engagement with the bushing such that the bushing is in frictional engagement with the stabilizer bar. A mounting bracket is adapted to connect the stabilizer bar to an automotive vehicle.

In a first aspect of the present invention the bushing includes voids extending longitudinally through the bushing on opposite sides of the stabilizer bar along one of the first and second radial planes thereby providing a different stiffness between the first and second radial directions.

In another aspect of the present invention, the bushing includes inserts extending longitudinally through the bushing on opposite sides of the stabilizer bar along one of the first and second radial planes thereby providing a different stiffness between the first and second radial planes.

In still another aspect of the present invention the bushing retainer provides a first compressive force along the first radial plane and a second compressive force along the second radial plane thereby providing a different stiffness between the first and second radial planes.

In yet another aspect of the present invention the bushing includes discreet longitudinal sections of a first material and a second material, the sections of the first material being generally aligned along the first radial plane, and the sections of the second material being generally aligned along the second radial plane, the first and second materials having different stiffness, thereby providing a different stiffness across the first and second radial planes.

The aspects of the present invention provide a stabilizer bar assembly that provides different stiffness between the first and second planes through the stabilizer bar.

DETAILED DESCRIPTION OF THE PREFERRED EMBODIMENTS

Figure 1:
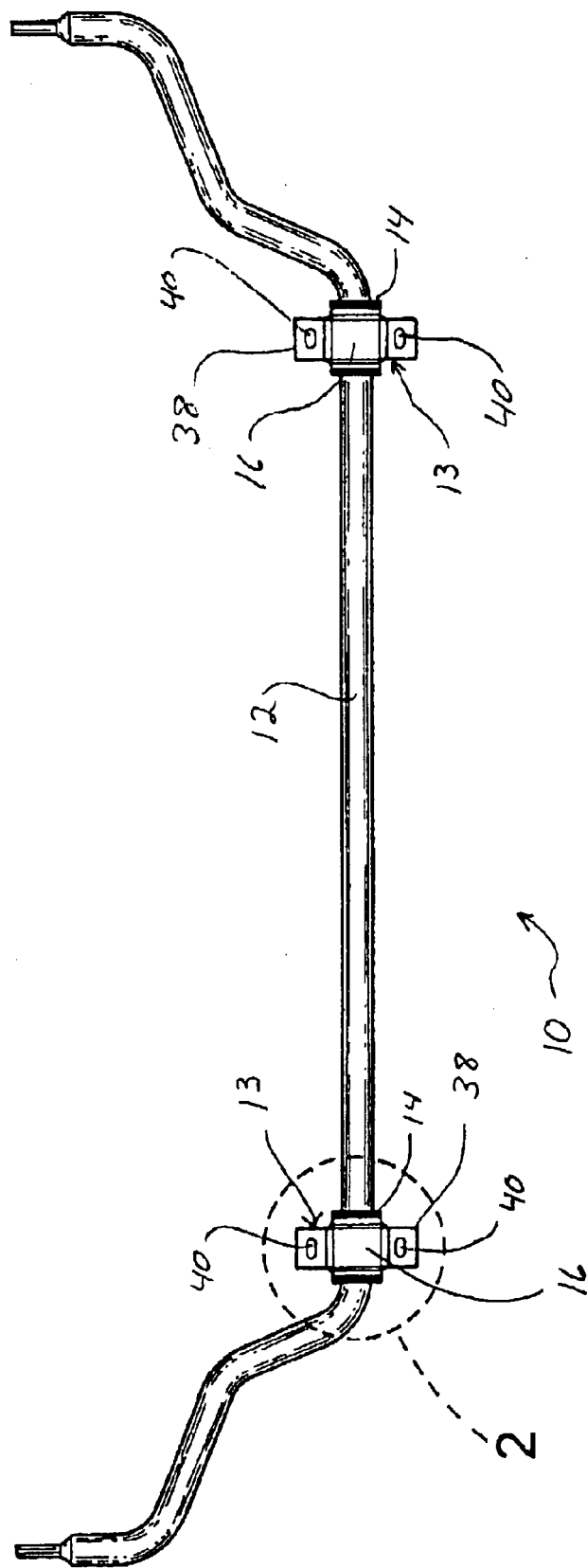
FIG. 1 is a plan view of a stabilizer bar of the present invention.
Figure 2:
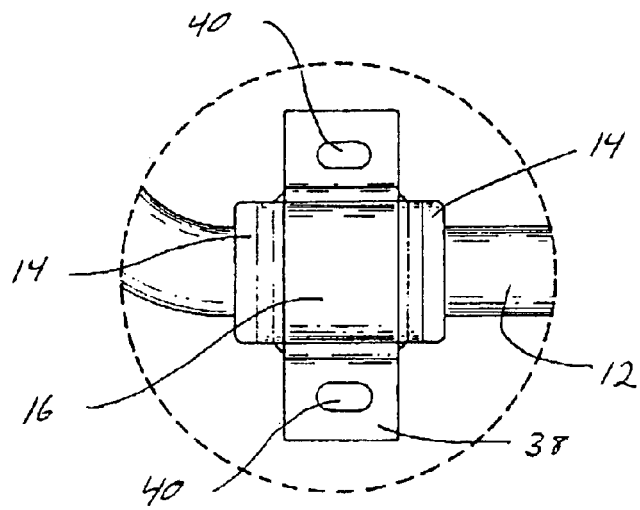
FIG. 2 is an enlarged view of the portion of the stabilizer bar shown in FIG. 1 enclosed by the circle numbered 2.
Figure 3:
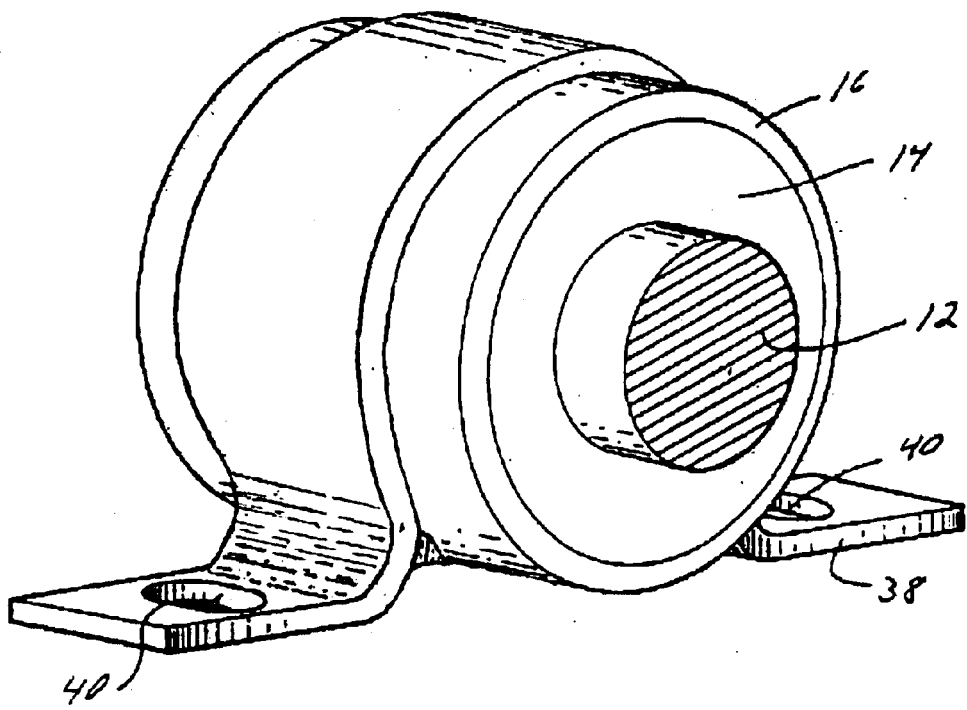
FIG. 3 is a partial perspective view of a portion of the stabilizer bar, bushing retainer, and bushing.

Referring to FIGS. 1–3, a stabilizer bar assembly for an automotive vehicle is shown generally at 10. The stabilizer bar assembly 10 includes a stabilizer bar 12 with at least one bushing assembly 13 mounted thereon. The stabilizer bar 12 is generally made from steel, and can be solid or hollow. It is to be understood, that the stabilizer bar 12 can be made from other suitable materials. The bushing assemblies 13 include a bushing retainer 16 that encompasses a bushing 14 and is in mechanical compressive engagement with the bushing 14 such that the bushing 14 is frictionally engaged with the stabilizer bar 12.

The bushing 14 is made from an elastomeric material, such as rubber, or some other resilient material. The bushing 14 is generally sleeve shaped having an cylindrical outer surface and a round passage extending therethrough defining an inner diameter. Preferably, the inner diameter of the bushing 14 is slightly smaller than an outer diameter of the stabilizer bar 12, however, it is to be understood that the present invention can be practiced with a bushing 14 having an inner diameter that is equal to or slightly larger than the outer diameter of the stabilizer bar 12.

Preferably, the bushing 14 is held onto the stabilizer bar 12 by friction alone. Alternatively, an adhesive can also be applied between the inner diameter of the bushing 14 and the stabilizer bar 12 to provide additional retention of the bushing 14 on the stabilizer bar 12.

Figure 4:
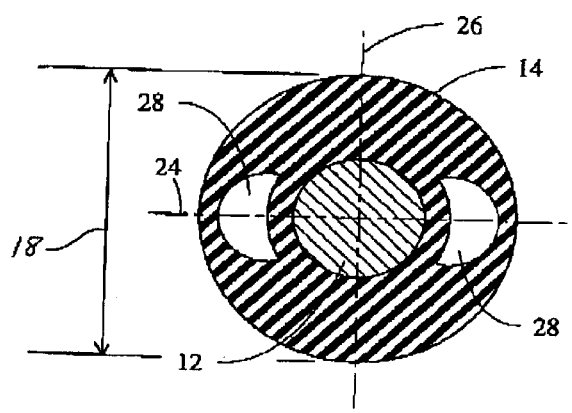
FIG. 4 is a sectional view of a first preferred embodiment having a single void formed along either side of the stabilizer bar prior to compression.

Once the bushing 14 properly located on the stabilizer bar 12, the bushing retainer 16 Is positioned about the bushing 14. Referring to FIG. 3 FIG. 4, the bushing retainer 16 is generally sleeve shaped having a cylindrical outer surface defining a first outer diameter 18 and a cylindrical passage 20 extending therethrough and defining an inner diameter.

Figure 5:
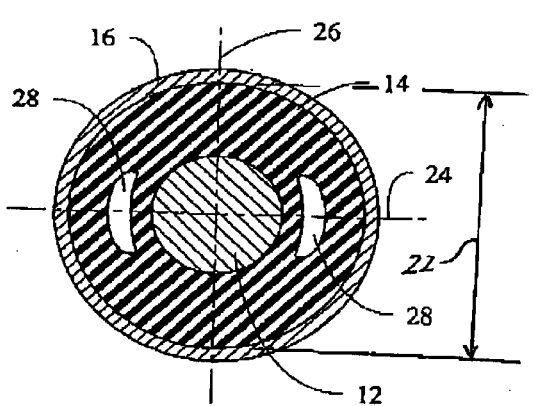
FIG. 5 is a sectional view similar to FIG. 4 after compression.

Referring to FIGS. 4 & 5, once the bushing retainer 16 is placed around the bushing 14, the bushing retainer 16 is reduced to a second, smaller outer diameter 22. As the outer diameter of the bushing retainer 16 is reduced, the bushing retainer 16 compresses the bushing 14. When the bushing retainer 16 is reduced to the second diameter 22, the bushing retainer 16 compresses the bushing 14 against the stabilizer bar 12 with enough force to create, or enhance, a frictional engagement between the stabilizer bar 12 and the bushing 14, which will prevent relative movement of the bushing 14 and the stabilizer bar 12. Preferably, the bushing retainer 16 is crimped down to the second diameter 22, however, other known methods can be employed to reduce the diameter of the bushing retainer 16 and induce the necessary compressive force.

Preferably, the bushing 14 is structured to provide, in response to forced applied to the stabilizer bar, a first stiffness along a first plane 24 passing through the stabilizer bar 12 and bushing assembly 13, and a second stiffness along a second plane 26 passing through the stabilizer bar 12 and bushing assembly 13. Preferably, the second plane 26 is oriented approximately perpendicular to the first plane 24.

A first preferred embodiment, shown in FIG. 4, includes opposed voids 28 extending longitudinally through the bushing 14. Preferably, the voids 28 are located on opposite sides of the stabilizer bar 12 along one of the first or second planes 24, 26. As shown the voids 28 extend along the first plane 24. The voids 28 are formed in the bushing 14 prior to the bushing 14 being assembled to the stabilizer bar 12 and being compressed by the bushing retainer 16, as shown in FIG. 4.

Figure 6:
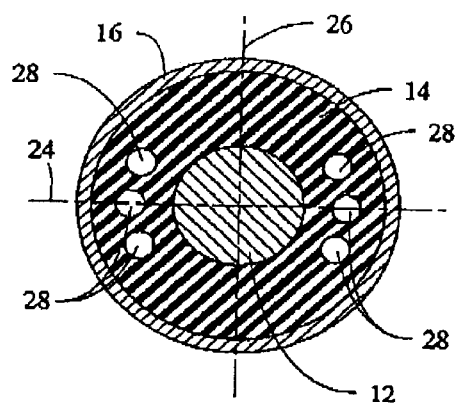
FIG. 6 is a sectional view similar to FIG. 5 including a plurality of voids on either side of the stabilizer bar.

Referring to FIG. 5, the voids 28 will affect the stiffness of the bushing 14 by making the bushing 14 less compressed in the vicinity of the voids 28, thereby making the bushing 14 less stiff in response to forces applied along the first plane 24. The bushing 14 can include a single void 28 on either side of the stabilizer bar 12 as shown in FIGS. 4 and 5, or alternatively, the bushing 14 can include a plurality of voids 28 formed on either side of the stabilizer bar 12, as shown in FIG. 6. The stabilizer assembly 10 shown in FIG. 6 includes three voids 28 on each side of the stabilizer bar 12. One of the voids 28 on each side is positioned along the first plans 24 and the remaining voids 28 on each side are centered around the first plane 24.

Figure 7:
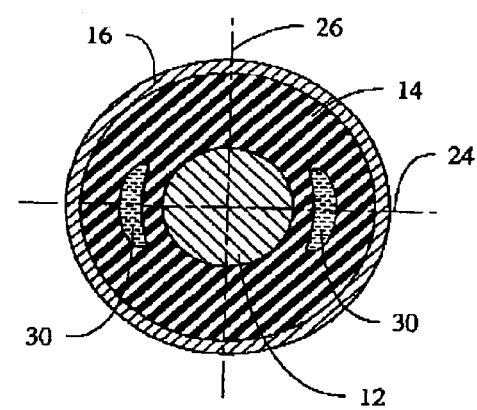
FIG. 7 is a sectional view similar to FIG. 5 wherein the voids are filled with a fluid.

Referring to FIG. 7, in a variation of the first preferred embodiment, the voids 28 are filled with a fluid 30. The fluid 30 will allow the stiffness to be varied along one of the first and second planes 24, 26. The fluid will provide more stiffness than the voids 28 alone, while still providing less stiffness than a solid bushing 14. Fluids of varying densities could also be selected to achieve a particular stiffness.

Figures 8, 9:
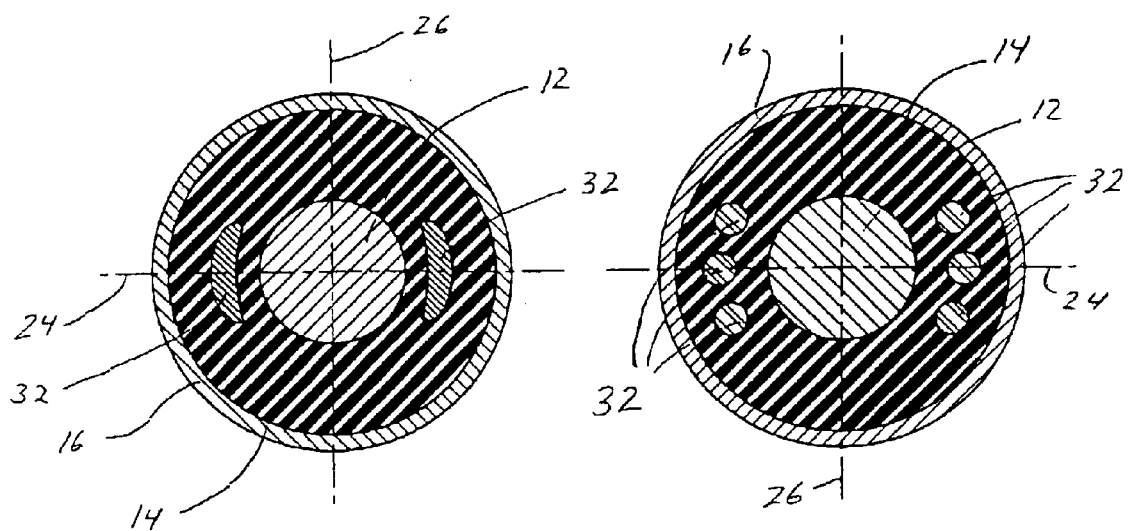
FIG. 8 is a sectional view of a second preferred embodiment including an insert within the bushing along either side of the stabilizer bar.
FIG. 9 is a sectional view similar to FIG. 8 wherein the bushing includes a plurality of inserts on either side of the stabilizer bar.

Referring to FIG. 8, in a second preferred embodiment, the bushing 14 includes inserts 32 extending longitudinally through the bushing 14. Preferably, the inserts 32 are located on opposite sides of the stabilizer bar 12 along one of the first and second planes 24, 26. As shown the inserts 32 extend along the sides of the stabilizer bar 12 along the first plane 24. The inserts 32 can be inserted prior to compression of the bushing 14 by the bushing retainer 16 or after compression of the bushing 14 by the bushing retainer 16.

The inserts 32 will affect the stiffness of the bushing 14 by making the bushing 14 more or less stiff depending upon the material of the insert 32. If the insert 32 is made from a material that is less stiff that the material the bushing 14 is made from, then the bushing 14 will provid less stiffness in the first plane 24. If the insert 32 is made from a material that is more stiff than the bushing 14, then the bushing 14 will provide more stiffness in the first plan, 24. The bushing 14 can include a single insert 32 on either side of the stabilizer bar 12 as shown in FIG. 8, or alternatively, the bushing 14 can include a plurality of inserts 32 formed on either side of the stabilizer bar 12, and centered or concentrated about one of the first and second planes, as shown in FIG. 9.

Figures 10, 11:
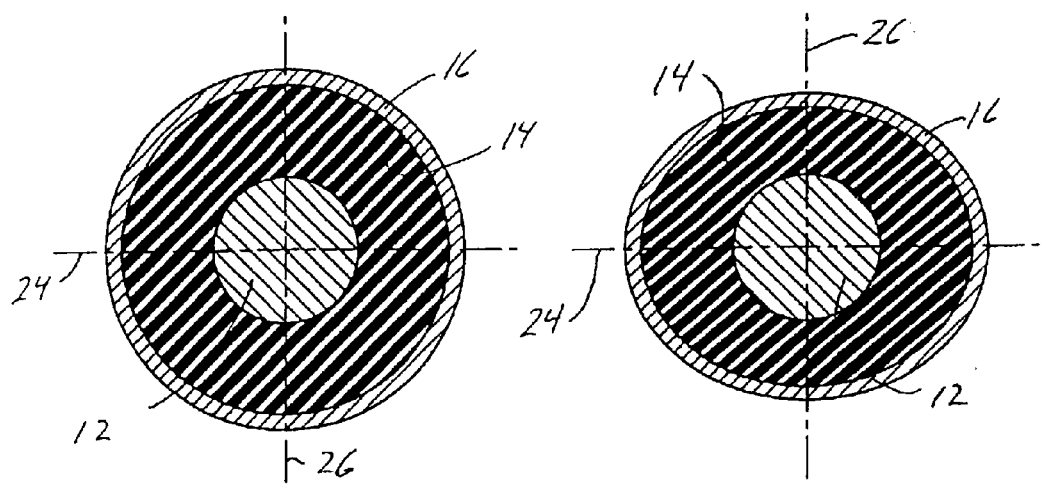
FIG. 10 is a sectional view of a third preferred embodiment prior to compression.
FIG. 11 is a sectional view of the third preferred embodiment after compression.

Referring to FIGS. 10 and 11, in a third preferred embodiment, different stiffness across the first and second planes 24, 26 is achieved by compressing the bushing retainer 16 more across the second plane 26 than across the first plane 24. Prior to compression, the bushing retainer 16 and the bushing 14 are substantially round, as shown in FIG. 10. During compression, more compressive force is applied to the bushing retainer 16 along the second plane 26 than in the first plane 24, therefore compressing the bushing 14 more along the second plane 26. Referring to FIG. 11, this results in an oval shaped bushing retainer 16 and a bushing 14 that is compressed more, and consequently is more stiff, across the second plane 26 than the bushing is across the first plane 24.

Figure 12:
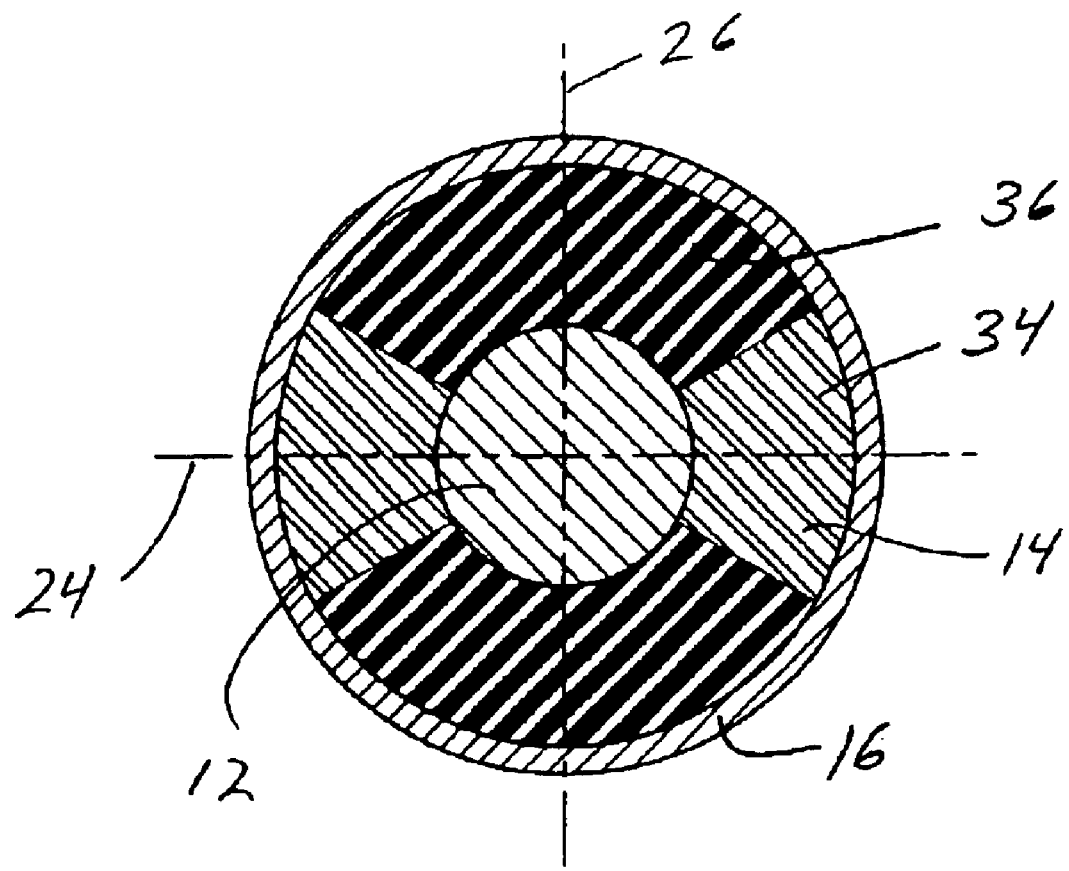
FIG. 12 is a sectional view of a fourth preferred embodiment wherein said bushing included discreet sections of different material.

Referring to FIG. 12, in a fourth preferred embodiment, the bushing 14 comprises alternating discreet longitudinal sections 34, 36. First longitudinal sections are made from a first material and second longitudinal sections are made from a second material. The first longitudinal sections 34 are aligned along the first plane 24, and the second longitudinal sections 36 are aligned along the second plane 26. The stiffness of the first longitudinal sections 34 is more or less stiff than the stiffness of the second longitudinal sections 36, thereby providing a different stiffness between said first and second radial planes 24, 26.

Referring again to FIGS. 1–3, a mounting bracket 38 is attached to the bushing retainer 16 to allow the bushing retainer 16 to be mounted to a structural component of the automobile. Preferably, the mounting bracket 38 includes mounting holes 40 that allow the mounting bracket 24 to be attached to the structure of an automobile. With the bushing 14 being made from a resilient material that allows limited movement of the stabilizer bar 12 relative to the bushing retainer 16, the bushing assembly 13 provides a spring rate and dampening of the torsional, radial, and axial movement of the stabilizer bar 12 relative to the structure of the vehicle.

One advantage of the present invention is that the same stabilizer bar assembly 10 can be used for applications requiring different spring rates within the bushings 14. The effective spring rate of the bushings 14 will depend on the amount of compression that is exerted by the bushing retainer 16. The same assembly 10 can have different spring rates by simply modifying the pressure at which the bushing retainers 16 are crimped. If the stabilizer bar assembly 10 is to be put into a vehicle which requires a soft suspension feel, then the bushing retainer 16 can be reduced to a second diameter 22 which compresses the bushing 14 but still provides a soft feel. If the stabilizer bar assembly 10 is to be installed in a vehicle requiring a stiff suspension, then the bushing retainer 16 can be reduced to an even smaller second diameter 22, thereby compressing the bushing 14 to a greater extent, and providing a stiffer feel to the suspension.

Additionally, by allowing the stiffness of the bushing 14 to be different along the first and second planes 24, 26, the suspension can be calibrated to provide a particular feel in response to predicted suspension reactions which tend to apply forces along the first plane 24 through the stabilizer bar 12, such as horizontal forces applied when the vehicle is accelerated or decelerated suddenly, and a different feel in response to other suspension reactions which tend to apply forces along the second plane 26 through the stabilizer bar 12, such as vertical forces applied when the vehicle travels over rough terrain.

The, stabilizer bar assembly 10 of the present invention also allows the bushings 14 to be repaired. Over time, as the bushings 14 loose some of their resiliency, their spring rate will change, causing the feel of the vehicle to change. In order to modify the spring rate, with the present invention, all that is required is to re-crimp the bushing retainer 16 to the desired compression pressure. This will allow an older vehicle to have the suspension stiffness adjusted or repaired without having to replace any components of the stabilizer bar assembly 10.

The foregoing discussion discloses and describes four preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. A stabilizer bar assembly for an automotive vehicle comprising:

a stabilizer bar;

a bushing mounted to said stabilizer bar, said bushing having a first stiffness in a first plane and a second stiffness in a second plane;

a bushing retainer in compressive engagement with said bushing such that said bushing is in frictional engagement with said stabilizer bar, thereby preventing relative movement of said bushing and said stabilizer bar;

a mounting bracket adapted to connect said stabilizer bar assembly to the automotive vehicle;

said bushing including a plurality of inserts extending longitudinally within said bushing on each side of said stabilizer bar, said inserts being concentrated about one of said first and second planes.

2. A stabilizer bar assembly for an automotive vehicle comprising:

a stabilizer bar;

a bushing mounted to said stabilizer bar, said bushing having a first stiffness in a first plane and a second stiffness in a second plane;

a bushing retainer in compressive engagement with said bushing such that said bushing is in frictional engagement with said stabilizer bar, thereby preventing relative movement of said bushing and said stabilizer bar;

a mounting bracket adapted to connect said stabilizer bar assembly to the automotive vehicle;

said bushing including a plurality of voids extending longitudinally within said bushing on each side of said stabilizer bar, at least one of said voids on each side of said stabilizer bar being positioned along one of said first and second planes and the remaining voids on each side of said stabilizer bar being centered about said one of said first and second planes.

3. The stabilizer bar assembly of claim 2 further including a fluid disposed within said voids.

4. A stabilizer bar assembly for an automotive vehicle comprising:

a stabilizer bar;

a bushing mounted to said stabilizer bar, said bushing having a first stiffness in a first plane and a second stiffness in a second plane;

a bushing retainer in compressive engagement with said bushing such that said bushing is in frictional engagement with said stabilizer bar, thereby preventing relative movement of said bushing and said stabilizer bar;

a mounting bracket adapted to connect said stabilizer bar assembly to the automotive vehicle;

said bushing including two longitudinal sections of a first material being positioned on opposite sides of said stabilizer bar and centered along said first plane and two longitudinal sections of a second material being positioned on opposite sides of said stabilizer bar and centered along said second plane, said first and second material having different stiffness such that said bushing provides a first compressive force along said first plane and a second compressive force along said second plane thereby providing said bushing with different stiffness between said first and second planes.

5. The stabilizer bar assembly of claim 1 wherein said first plane and said second plane are approximately perpendicular to one another.

6. The stabilizer bar assembly of claim 1 wherein said bushing is formed from an elastomeric material.

7. The stabilizer bar assembly of claim 1 wherein said mounting bracket is fixedly connected to said bushing retainer.

8. The stabilizer bar assembly of claim 1 further including a chemical bonding agent fixedly bonding said bushing to said stabilizer bar.

9. The stabilizer bar assembly of claim 1, wherein at least one of said inserts on each side of said stabilizer bar is positioned along one of said first and second planes and the remaining inserts on each side of said stabilizer bar are centered about said one of said first and second planes.

10. The stabilizer bar of claim 9, wherein said stabilizer bar includes three inserts extending longitudinally within said bushing on each side of said stabilizer bar, one of said inserts on each side of said stabilizer bar being positioned along one of said first and second planes and the other two of said inserts being centered about said one of said first and second planes.

11. The stabilizer bar of claim 2, wherein said stabilizer bar includes three voids extending longitudinally within said bushing on each side of said stabilizer bar, one of said voids on each side of said stabilizer bar being positioned along one of said first and second planes and the other two of said voids being centered about said one of said first and second planes.

* * * * *